(12) United States Patent
Gildein, II et al.

(10) Patent No.: US 9,953,509 B2
(45) Date of Patent: *Apr. 24, 2018

(54) PERSONAL OBJECT LOCATION MANAGER

(71) Applicant: International Business Machines Corporation, Armonk, NY (US)

(72) Inventors: Michael E. Gildein, II, Wappingers Falls, NY (US); Vijai Kalathur, Wappingers Falls, NY (US); Rajaram B. Krishnamurthy, Pleasant Valley, NY (US); Christine D. Mikijanic, Monroe, NY (US); Moses J. Vaughan, Mahwah, NJ (US)

(73) Assignee: International Business Machines Corporation, Armonk, NY (US)

( * ) Notice: Subject to any disclaimer, the term of this patent is extended or adjusted under 35 U.S.C. 154(b) by 83 days.

This patent is subject to a terminal disclaimer.

(21) Appl. No.: 15/093,784

(22) Filed: Apr. 8, 2016

(65) Prior Publication Data

US 2017/0124849 A1 May 4, 2017

Related U.S. Application Data

(63) Continuation of application No. 14/926,015, filed on Oct. 29, 2015, now Pat. No. 9,613,517.

(51) Int. Cl.
*G08B 13/14* (2006.01)
*G08B 21/24* (2006.01)
(Continued)

(52) U.S. Cl.
CPC ............ *G08B 21/24* (2013.01); *G08B 25/10* (2013.01); *H04W 4/12* (2013.01)

(58) Field of Classification Search
None
See application file for complete search history.

(56) References Cited

U.S. PATENT DOCUMENTS 7,030,761 B2 4/2006 Bridgelall et al.
8,126,680 B2 2/2012 Troxler et al.
(Continued)

FOREIGN PATENT DOCUMENTS

WO 0010026 A2 2/2000
WO 2006014900 A2 2/2006
WO 2006014900 A3 2/2006

OTHER PUBLICATIONS

Lindsay et al., "RFID Locating Systems for Linking Valued Objects with Multimedia Files", An IP.com Prior Art Database Technical Disclosure, IP.com No. 000021113, IP.com Electronic Publication: Dec. 23, 2003, 15 pages.

(Continued)

*Primary Examiner* — Brent Swarthout
(74) *Attorney, Agent, or Firm* — Michael O'Keefe

(57) ABSTRACT

A method, computer program product, and system for object location managing. The method including generating a first list including one or more personal objects based on a personal schedule of a user, generating a second list including one or more personal objects physically located within a predefined range of a checkpoint, comparing the first list to the second list to determine which personal objects are on both lists and which personal objects are missing, if any, from the second list, and notifying the user with the results of the comparison between the first list and the second list by activating an alarm.

6 Claims, 5 Drawing Sheets

(51) Int. Cl.
*G08B 25/10* (2006.01)
*H04W 4/12* (2009.01)

(56) References Cited

U.S. PATENT DOCUMENTS

| | | |
|---|---|---|
| 8,294,580 B2 | 10/2012 | Witwer et al. |
| 8,547,222 B2 | 10/2013 | Aninye et al. |
| 2006/0267731 A1 | 11/2006 | Chen |
| 2008/0157966 A1 | 7/2008 | Danvir et al. |
| 2008/0238009 A1 | 10/2008 | Carpenter |

OTHER PUBLICATIONS

Lindsay et al., "Retail RFID Systems without Smart Shelves", An IP.com Prior Art Database Technical Disclosure, IP.com No. 000021114, IP.com Electronic Publication: Dec. 23, 2003, 13 pages.

Mell et al., "The NIST Definition of Cloud Computing", Recommendations of the National Institute of Standards and Technology, National Institute of Standards and Technology, Special Publication 800-145, Sep. 2011, 7 pages.

Guerrieri et al., "RFID-Assisted Indoor Localization and Communication for First Responders", Proc. 'EuCAP 2006', Nice, France, Nov. 6-10, 2006 (ESA SP-626, Oct. 2006), 6 pages.

Pending U.S. Appl. No. 14/926,015, filed Oct. 29, 2015, entitled: "Personal Object Location Manager", 30 pages.

IBM: List of IBM Patents or Patent Applications Treated As Related (Appendix P), Apr. 11, 2016, 2 pages.

ical-object-location-manager-page">

PERSONAL OBJECT LOCATION MANAGER

BACKGROUND

The present invention relates generally to a method, system, and computer program product for a personal object location manager, and more particularly to a method, system, and computer program product for keeping track of personal objects based on a personal schedule.

A technique for detecting a position of an object is a system that includes a position detecting antenna and a wireless tag attached to one or more objects. The wireless tag is unique for each of the one or more objects. The position detecting antenna determines a position of each wireless tag and identifies an object location per the unique wireless tag.

SUMMARY

Embodiments of the present invention disclose a method, computer program product, and system for object location managing.

The method including generating a first list including one or more personal objects based on a personal schedule of a user, generating a second list including one or more personal objects physically located within a predefined range of a checkpoint, comparing the first list to the second list to determine which personal objects are on both lists and which personal objects are missing, if any, from the second list, and notifying the user with the results of the comparison between the first list and the second list by activating an alarm.

A computer program product for object location managing, the computer program product including one or more computer-readable storage media and program instructions stored on the one or more computer-readable storage media, the program instructions including, program instructions to generate a first list including one or more personal objects based on a personal schedule of a user, program instructions to generate a second list including one or more personal objects physically located within a predefined range of a checkpoint, program instructions to compare the first list to the second list to determine which personal objects are on both lists and which personal objects are missing, if any, from the second list, and program instructions to notify the user with the results of the comparison between the first list and the second list by activating an alarm.

A computer system for object location managing, the computer system including one or more computer processors, one or more computer-readable storage media, and program instructions stored on the one or more computer-readable storage media for execution by at least one of the one or more processors, the program instructions including program instructions to generate a first list including one or more personal objects based on a personal schedule of a user, program instructions to generate a second list including one or more personal objects physically located within a predefined range of a checkpoint, program instructions to compare the first list to the second list to determine which personal objects are on both lists and which personal objects are missing, if any, from the second list, and program instructions to notify the user with the results of the comparison between the first list and the second list by activating an alarm.

BRIEF DESCRIPTION OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the interest of not obscuring the presentation of embodiments of the present invention, in the following detailed description, some processing steps or operations that are known in the art may have been combined together for presentation and for illustration purposes and in some instances may have not been described in detail. In other instances, some processing steps or operations that are known in the art may not be described at all. It should be understood that the following description is rather focused on the distinctive features or elements of various embodiments of the present invention.

The present invention relates generally to a method, system, and computer program product for a personalized object location manager, and more particularly to a method, system, and computer program product for keeping track of personal belongings based on a personal schedule. One way by which to keep track of personal belongings may include using a wireless checkpoint system and dependencies between the personal belongings to verify that a specific personal belonging is within a predetermined range at a distinct time and place.

An embodiment by which to use a checkpoint system and dependencies between the personal belongings to verify that a specific personal belonging is within a predetermined range at a distinct time and place is described in detail below by referring to the accompanying drawings in FIGS. 1 to 5. Those skilled in the art will readily appreciate that the detailed description given herein with respect to these figures is for explanatory purposes as the invention extends beyond these limited embodiments.

Figure 1:
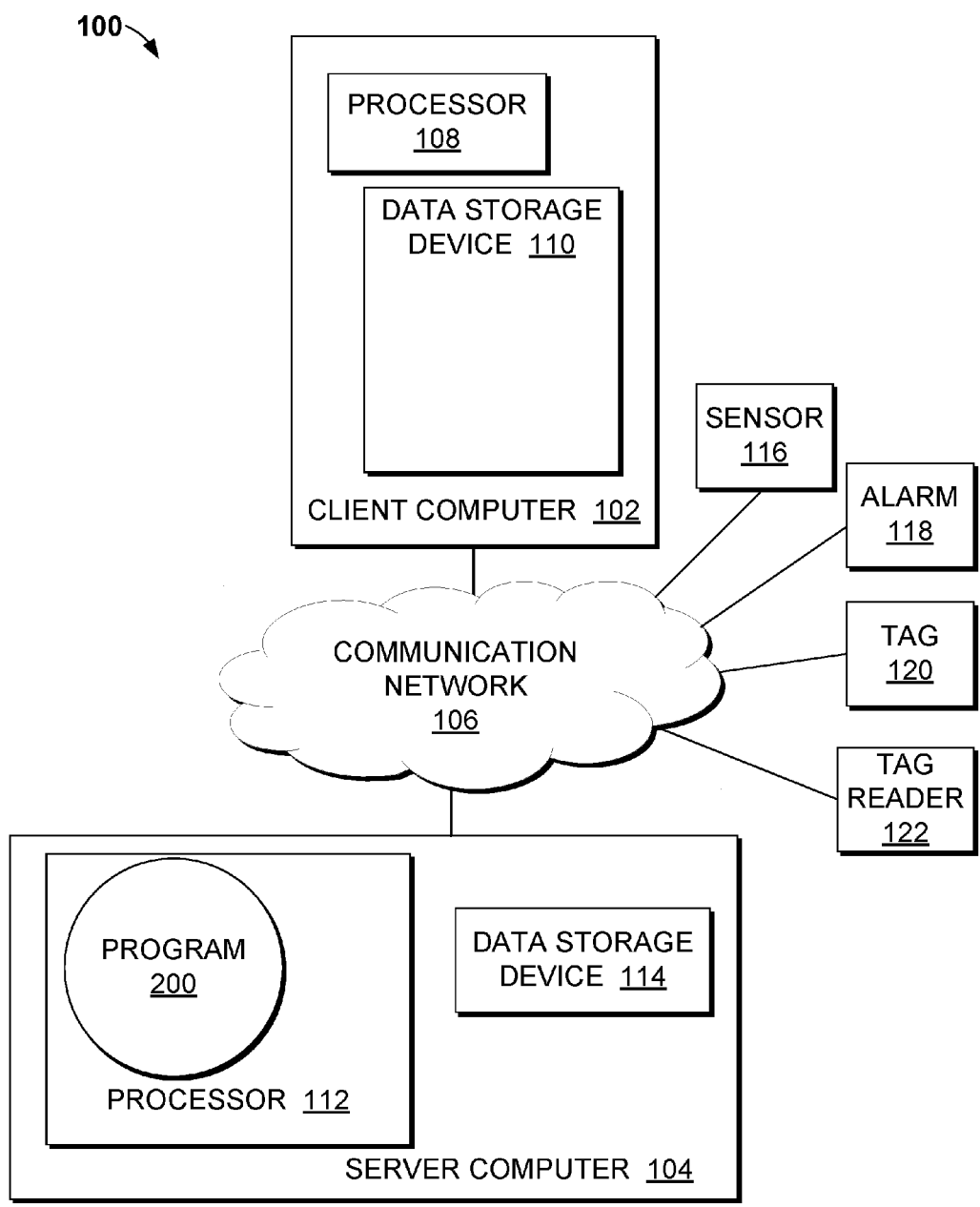
FIG. 1 is a functional block diagram illustrating a personalized object location manager environment, in accordance with an embodiment of the present invention.

FIG. 1 is a functional block diagram illustrating a system 100, in accordance with an embodiment of the present invention. The system 100 may include a client computer 102, a server computer 104, a sensor 116, an alarm 118, a tag 120 and a tag reader 122. The client computer 102, the server computer 104, the sensor 116, the alarm 118, the tag 120 and the tag reader 122 may communicate via a communication network 106 (hereinafter "network"). The client computer 102 may include a processor 108, a data storage device 110 and is enabled to interface with a user and communicate with the server computer 104. The server computer 104 may include a processor 112 and a data storage device 114 that is enabled to run an object location manager program 200 (hereinafter "program"). The sensor 116, the alarm 118, the tag 120 and the tag reader 122 may be enabled to interface with the program 200 via the network 106.

In an embodiment, the client computer 102 may operate as an input device including a user interface while the program 200 may run primarily on the server computer 104. In an alternative embodiment, the program 200 may run primarily on the client computer 102 while the server computer 104 may be used for processing a storage of data used by the program 200. It should be noted, however, that processing for the program 200 may, in some instances be shared amongst the client computer 102 and the server computer 104 in any ratio. In another embodiment, the program 200 may operate on more than one server computer 104, client computer 102, or some combination of server computers 104 and client computers 102, for example, a plurality of client computers 102 communicating across the network 106 with a single server computer 104.

The network 106 may include wired connections, wireless connections, fiber optic connections, infrared, Wi-Fi, Radio-Frequency Identification (hereinafter "RFID"), Bluetooth, Global Positioning System (hereinafter "GPS") or some combination thereof. In general, the network 106 can be any combination of connections and protocols that will support communications between the client computer 102 and the server computer 104. The network 106 may include various types of networks, such as, for example, a local area network (LAN), a wide area network (WAN) such as the Internet, a telecommunication network, a wireless network, a public switched network and/or a satellite network.

In various embodiments, the client computer 102 and/or the server computer 104 may be, for example, a laptop computer, tablet computer, netbook computer, personal computer (PC), a desktop computer, a personal digital assistant (PDA), a smart phone, a mobile device, or any programmable electronic device capable of communicating with the server computer 104, the sensor 116, the alarm 118, the tag 120 and the tag reader 122 via the network 106. As described below with reference to FIG. 5, the client computer 102 and the server computer 104 may each include internal and external components.

In an embodiment, the system 100 may include any number of client computers 102, server computers 104, sensors 116, alarms 118, tags 120 and tag readers 122; however only one of each is shown for illustrative purposes only. It may be appreciated that FIG. 1 provides only an illustration of an implementation and does not imply any limitations with regard to the environments in which different embodiments may be implemented. Many modifications to the depicted environments may be made based on design and implementation requirements.

The sensor 116 may be an optical sensor, a motion sensor, a laser sensor, an electromechanical sensor, among other types. The alarm 118 may an individual component of the system 100 or may be integrated into the client computer 102 or another component of the system 100. The alarm 118 may be audio or sensory. For example, the alarm 118 may include a bell, a ringer, a light, an email, a text message, a vibration, or any type of alarm. The tag 120 may be an RFID tag. The tag 120 may be affixed to or integrated in a personal object. The tag 120 may contain electronically stored information identifying the personal object to the tag reader 122 or another component of the system 100. The tag reader 122 may be an RFID reader. The tag reader 122 may have a two-way radio transmitter-receivers. The tag reader 122 may be capable of sending and receiving a signal to and from the tag 120. The signal may contain information to identify and locate the tag 120 and the personal object which the tag 120 is affixed to or integrated into. In an alternate embodiment, the tag 120 may be a GPS enabled identifier which can communicate with the tag reader 122 and other devices in the system 100.

A personal object with a tag 120 attached may include, for example, a purse, a wallet, a car key, a house key, an office key, a car registration, sunglasses, a cellphone, a laptop, a briefcase, a set of keys, a gym bag, a pair of sneakers, exercise equipment, an overnight bag and a toiletry bag. Each personal object will preferably have a unique tag 120.

The system 100 may include one or more tag readers 122. The tag reader 122 may be placed at a checkpoint. Checkpoint locations may include an entrance to a building, a wall, a table, a desk, an automobile, a workplace, a purse, a briefcase, a suitcase, a gym bag or a structure. In some embodiments, the tag reader 122 may be a mobile device or a large stationary device. In general mobile tag readers 122 may have a scanning range of less than approximately a hundred feet, whereas stationary tag readers 122 may have a scanning range of several hundred feet or more. The tag reader 122 may be configured to scan and search for one or more tags 120. The scan may be initiated manually by a user or automatically based on the user's calendar or an input from one of the sensors 116. The tag reader 122 may be selected specifically based on its scanning range. The tag reader 122 may be an industry-grade or a consumer-grade product.

The system 100 may be configured as a personal object location manager to keep track of personal objects based on a personal schedule. When a tag 120 comes within a specified range of a checkpoint, the program 200 in conjunction with the system 100 can check to see if the correct tags 120 are in range based on the personal schedule. The alarm 118 can notify the user which of the tags 120 are present and which of the tags 120 are missing. The system 100 may be implemented in any one of several scenarios. For example, leaving an area without a required personal object, locating a personal object dropped along a route, and finding an object that is lost inside a predefined area, such as a home or an automobile.

The tag reader 122 can be used to identify when a personal object with a tag 120 has been scanned by the tag reader 122. A scan by the tag reader 122 can be initiated by an event on the personal schedule, can be initiated by a tag 120 passing by the tag reader 122, or can scan continuously. The tag reader 122 can also be used to search for the personal object which has the tag 120.

The server computer 104 may use predictive analytics to make conclusions based on complex time and relationships between time, locations and personal objects.

The program 200 is described and explained in further detail below with reference to FIGS. 2 to 5.

Figure 2:
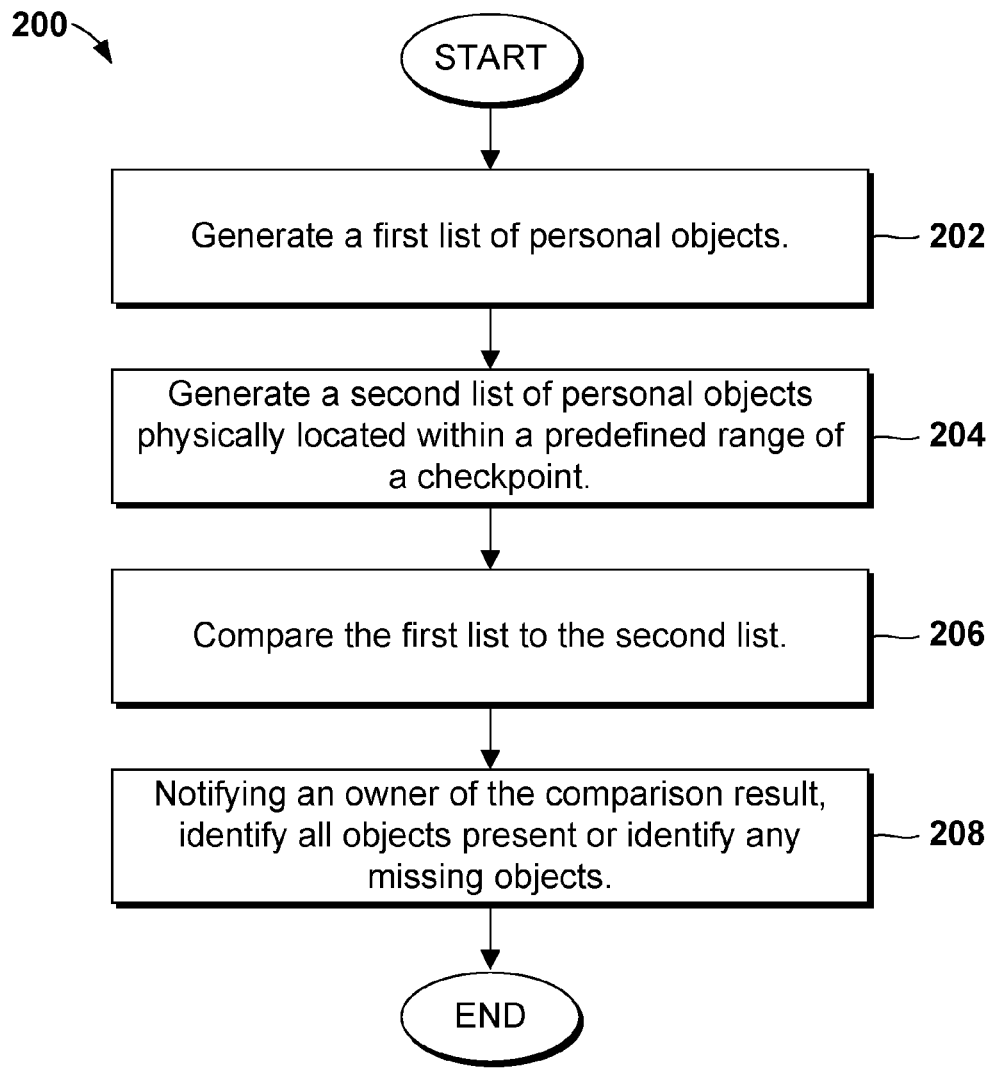
FIG. 2 is a flowchart depicting operational steps of the personalized object location manager within the data processing environment of FIG. 1, in accordance with an embodiment of the present invention.

FIG. 2 is a flowchart depicting operational steps of the program 200 for keeping track of personal belongings, in accordance with an embodiment of the present invention. First, the program 200 may generate a first list of personal objects based on a personal schedule, at step 202. The first list of personal objects may be derived from one or more events in the personal schedule of a user. The first list of personal objects may be directly associated with or based on the one or more events, along with additional information about the event. The additional event information may include, for example, an event name, an event date, an event time, and/or an event location may be used to generate the first list of personal objects. In some cases, the event may be automatically generated or manually entered by the user. For example, the first list of personal objects may be personal objects needed for one or more events. The personal objects in the first list may each have a tag 120 associated with it. In an embodiment, the event may be work, the event date may be Monday, Jan. 5, 2015, the event time may be 9 AM to 5 PM and the event location may be an office location of the user. The first list of personal objects may be user defined or may be commonly defined for the event work. In this embodiment, the first list of personal objects may therefore include a briefcase, a wallet, a laptop computer and a pen.

Next the program 200 may generate a second list of personal objects at step 204. The second list of personal objects may be generated by scanning for personal objects within a predefined range of a checkpoint. A checkpoint may be any location common to a plurality of personal objects. For example, a checkpoint may include an entryway, a doorway, a car, a purse, a bag, or a smart phone.

Specifically, the tag reader 122 may perform a scan and identify tags 120 within a scan area or in close proximity to a checkpoint. Proximity to a checkpoint may be defined by the chosen wireless technology of the tags 120 and the tag readers 122. In an embodiment, the scan may be initiated by the event in a personal schedule. The event may have a scan scheduled at a pre-determined time prior to the event. For example, the user may schedule a scan to be performed by a tag reader 122 located at the checkpoint of a personal automobile and is to be performed 30 minutes prior to the event name of 'out for coffee'. The first list of personal objects for the event 'out for coffee' may include a purse, a house key, a car key, a credit card and sunglasses. The tag reader 122 at the checkpoint of the personal automobile identifies the tags 120 which are present within the pre-defined range of the tag reader 122 of the checkpoint. The program 200 may then create the second list of personal objects, based on the tags 120 which have been identified from the scan in this example. The second list of personal objects resulting from the scan may include the purse, the house key, the car key and the credit card.

In an alternate embodiment, the scan may be initiated by a tag 120 or a user passing the sensor 116. The sensor 116 may detect that a user or a tag 120 is nearby or has passed nearby the sensor 116. The sensor 116 may communicate with the program 200, via the network 106, and the program 200 may initiate the scan. The user may pre-determine that a scan is performed by one or more tag readers 122 when the sensor 116 has sensed that the user or the tag 120 has passed the sensor 116. The user may pre-determine that the scan is performed by one or more tag readers 122 based on the location of the sensor 116 in relation to a checkpoint. For example, if the scan is initiated by a tag 120 passing the sensor 116 located at the checkpoint of a house entrance, the user may pre-determine that a tag reader 122 in the house entrance checkpoint is the only tag reader 122 to perform the scan.

In an additional embodiment, the scan may be manually initiated by the user to search for one or more personal objects from the first list of personal objects. The user may initiate a scan and may specify one or more tag readers 122 to perform the scan. Each of the tag readers 122 may then perform a scan, each within a pre-defined range. The tag reader 122 may provide information on the tags 120 which have been located in the scan area. The program 200 may then create the second list of personal objects, based on the tags 120 which have been identified from the scan. The second list of personal objects may identify the tag reader 122 and the checkpoint which identified the tag 120, for each object. In an example, the first list of personal objects may include a hat and a driver's license. The second list of personal objects may include a wallet, a house and the hat at the house entrance checkpoint, and may include a car key, sunglasses and the driver's license at the personal automobile checkpoint.

Next, the program 200 may compare the first list of personal objects to the second list of personal objects, at step 206. The program 200 may identify a personal object on the first list of personal objects which is not on the second list of personal objects and may be a missing personal object. The program 200 may determine that the first list of personal objects matches the second list of personal objects and that no personal objects are missing. The program 200 may identify the checkpoint at which each of the personal objects have been scanned.

Next, the program 200 may notify the user regarding the results of the comparison of the first list of personal objects to the second list of personal objects, at step 208. The notification may identify whether all personal objects in the first list have been scanned or if there is one or more missing objects. In an embodiment, the program 200 may notify the user with the alarm 118. Preferably, the notification may identify to the user which personal object, if any, is missing from the second list. If all of the personal objects are present and the first list matches the second list, the program 200 may notify the user that all personal objects on the first list are present and accounted for. In an embodiment, the alarm 118 may send a text or an email to the user. In an alternate embodiment, the alarm 118 may flash a light once to indicate all objects are located and flash the light twice to indicate that one or more personal items are missing. The notification may identify the personal objects which have been scanned, and identify the checkpoint which each personal object was located.

In an alternate embodiment, one or more personal objects of the first list of personal objects may be referred to as a super object. The personal objects on the first list are based on a user's personal schedule. As such, the personal objects classified as super objects may each have a plurality of personal objects associated with them. In such cases, the program 200 may generate a third list of personal objects based on the super object. Meanwhile, the super object remains as one of the personal objects on the first list.

The super object may be automatically defined or user defined. While the first list of personal object may include a variety of items, personal objects such as the purse, the gym bag, and the overnight bag may each be identified or classified as a super object.

The third list of personal objects associated with the purse may include, for example, a wallet, a house key, a car key, sunglasses and a cellphone. The third list of personal objects associated with the gym bag may include a pair of sneakers and a set of weights. The third list of personal objects associated with an overnight bag may include a suitcase, a toothbrush and toothpaste.

In the present embodiment, the super object itself may be equipped with a dedicated tag reader 122. The program 200 may generate a fourth list of personal objects based on a scan by the dedicated tag reader 122 associated with or located on the super object. The dedicated tag reader 122 may be a portable device or permanently affixed to the super object and capable of performing a scan in a pre-defined small area of the super object. In an embodiment, for example, the dedicated tag reader 122 may have a scan area of approximately a 4 foot radius surrounding the super object. The dedicated tag reader 122 may perform a scan for any tags 120 present, but specifically scan for tags 120 present within the super object.

Next the program 200 may identify whether or not a personal object is missing from the super object. The program 200 may compare the third list of personal objects with the fourth list of personal objects. The program 200 may identify any personal objects on the third list of personal objects that do not appear on the fourth list of personal objects. Any personal objects on the third list of personal objects and not on the fourth list of personal objects would be identified by the program 200 as a missing object. The program 200 may then notify the user of the scan results, as described above.

Another example of a scenario involving a super object may include a briefcase, which may be on the first list of personal object and further classified as a super object. The third list of personal objects associated with the briefcase may include a wallet, a cell phone and car keys. After scanning, the program 200 may recognize that the car keys are missing from the fourth list of personal objects and the program 200 may notify the owner of the brief case with the alarm 118. In an embodiment, as described above, the alarm 118 may send a text notification to the owner's smartphone notifying them that the car keys are missing from the briefcase.

In an example, on Wednesday January 7 at 7 am, per the schedule, the next event is work at 8 am. There is a first list of personal objects identified with the event work, which includes the briefcase super object, and sunglasses. A sensor 116 at checkpoint of a house entrance notifies the program 200 that a user or one or more tags 120 have passed the sensor 116. The program 200 activates the tag reader 122 which is located at the house entrance. The tag reader 122 scans the tags 120 which are in the pre-defined area of the tag reader 122. The program 200 identifies the personal objects associated with the tags 120 and generates a second list of personal objects. A scan by the tag reader 122 may be initiated by the program 200 based on an event to confirm that a specific set of objects is within range at distinct times and places throughout the day. The scan by the tag reader 122 may be initiated by another trigger. The second list may include the briefcase super object. The super-object, may be treated as one personal object when coming within range of a tag reader 122. The program 200 may compare the first list and the second list and identify that the personal object of sunglasses are missing. The program 200 may notify the user via an alarm 118 that the sunglasses are missing. The alarm 118 to the user may include a text message and may also include an auditory sound.

This invention may help identity missing personal objects and may help a user find the missing personal objects. In an example, a user may create a first list of personal items, which are the items the user is attempting to locate. The first list of personal items may include a cell phone, a cell phone charger cord and a car registration. The user may trigger the program 200 to perform a scan at one or more checkpoints by one or more tag readers 122. The tag readers 122 provide a list of tags 120 found in the vicinity of each tag reader 122. The program 200 identifies the personal objects associated with the tags 120 and generates a second list of personal objects. The program 200 may notify the user via an alarm 118 if the objects in the first list are found in the second list, and may identify which checkpoint and tag reader 122 scanned each of the items on the first list. The alarm 118 may be a light blinking at the location of the checkpoint, and/or may be an email to the user. In this example, the cell phone and the cell phone charger cord may be located at a kitchen checkpoint and the car registration may be located in the personal automobile.

The advantages of this system is that is customizable to the preferences of the individual user, and can be used as a tool to organize his or herself on a day-to-day basis, since it is bidirectional, calendar-based, and can keep track of the relationships between objects.

Figure 3:
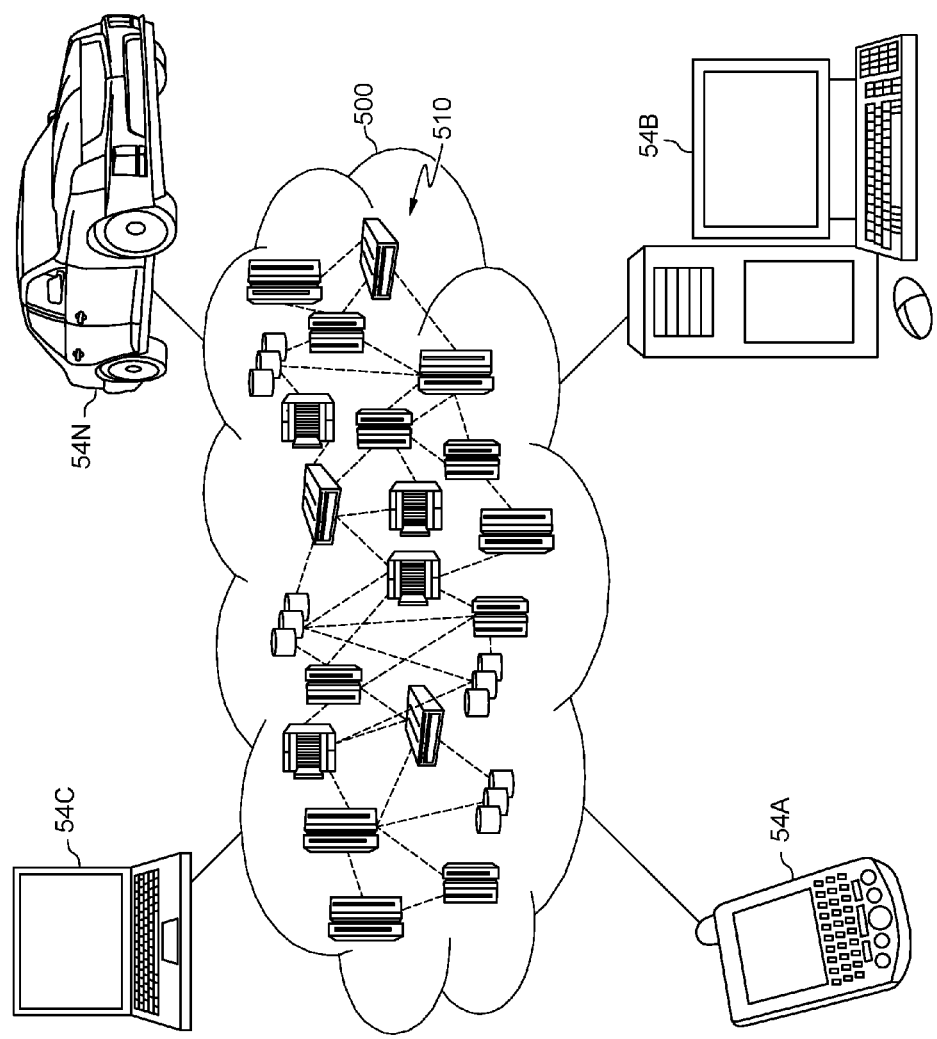
FIG. 3 is a block diagram of an illustrative cloud computing environment including the computer system depicted in FIG. 1, in accordance with an embodiment of the present disclosure.
Figure 5:
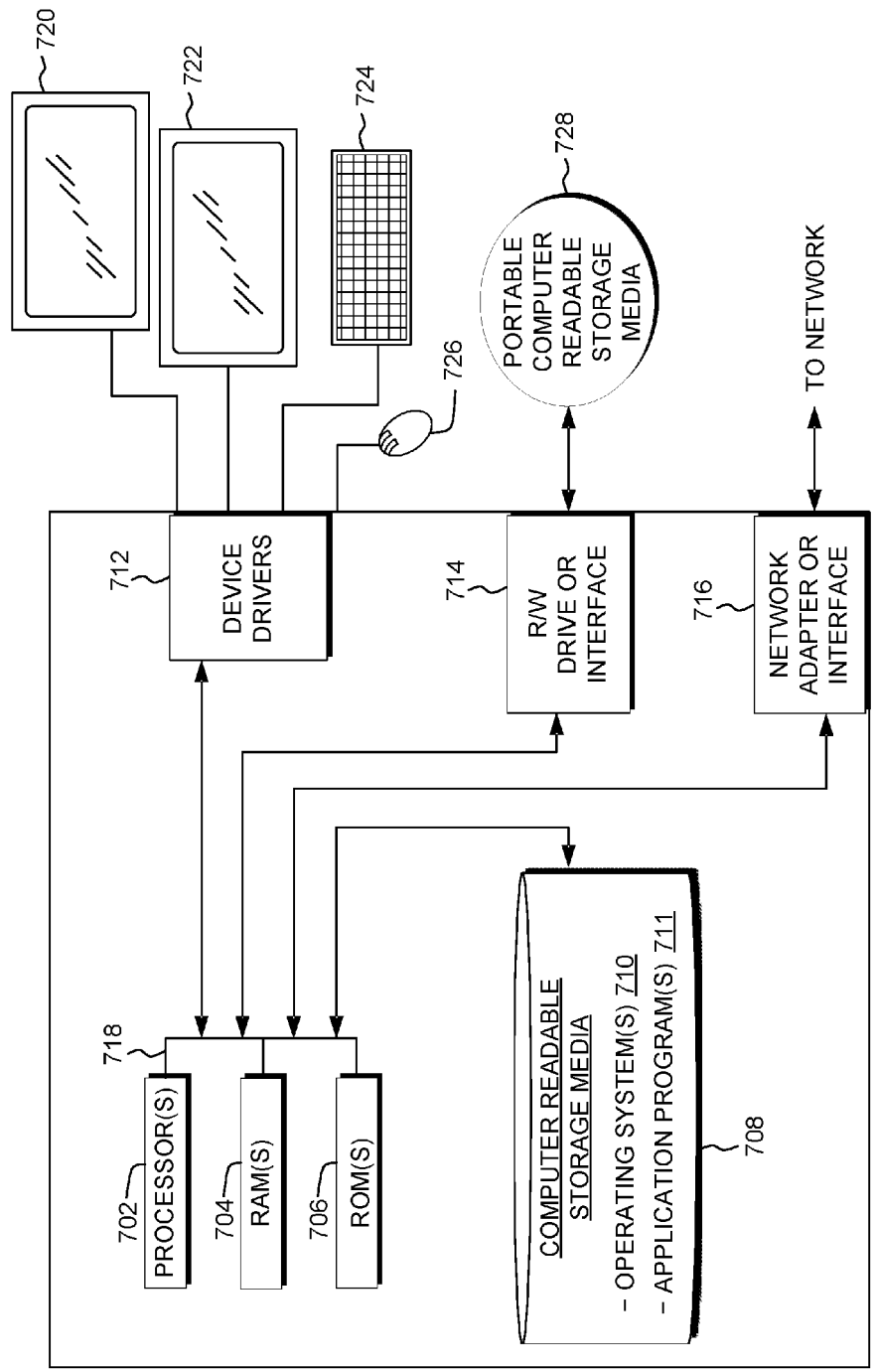
FIG. 5 is a functional block diagram of components of the proxy server computer executing the object location manager program, in accordance with an embodiment of the present invention.

FIG. 3 is a depiction of an illustrative cloud computing environment 500. As shown, cloud computing environment 500 comprises one or more cloud computing nodes 510 with which local computing devices used by cloud consumers, such as, for example, personal digital assistant (PDA) or cellular telephone 54A, desktop computer 54B, laptop computer 54C, and/or automobile computer system 54N may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that computing nodes 510 and cloud computing environment 500 can communicate with any type of computerized device over any type of network and/or network addressable connection (e.g., using a web browser).

Figure 4:
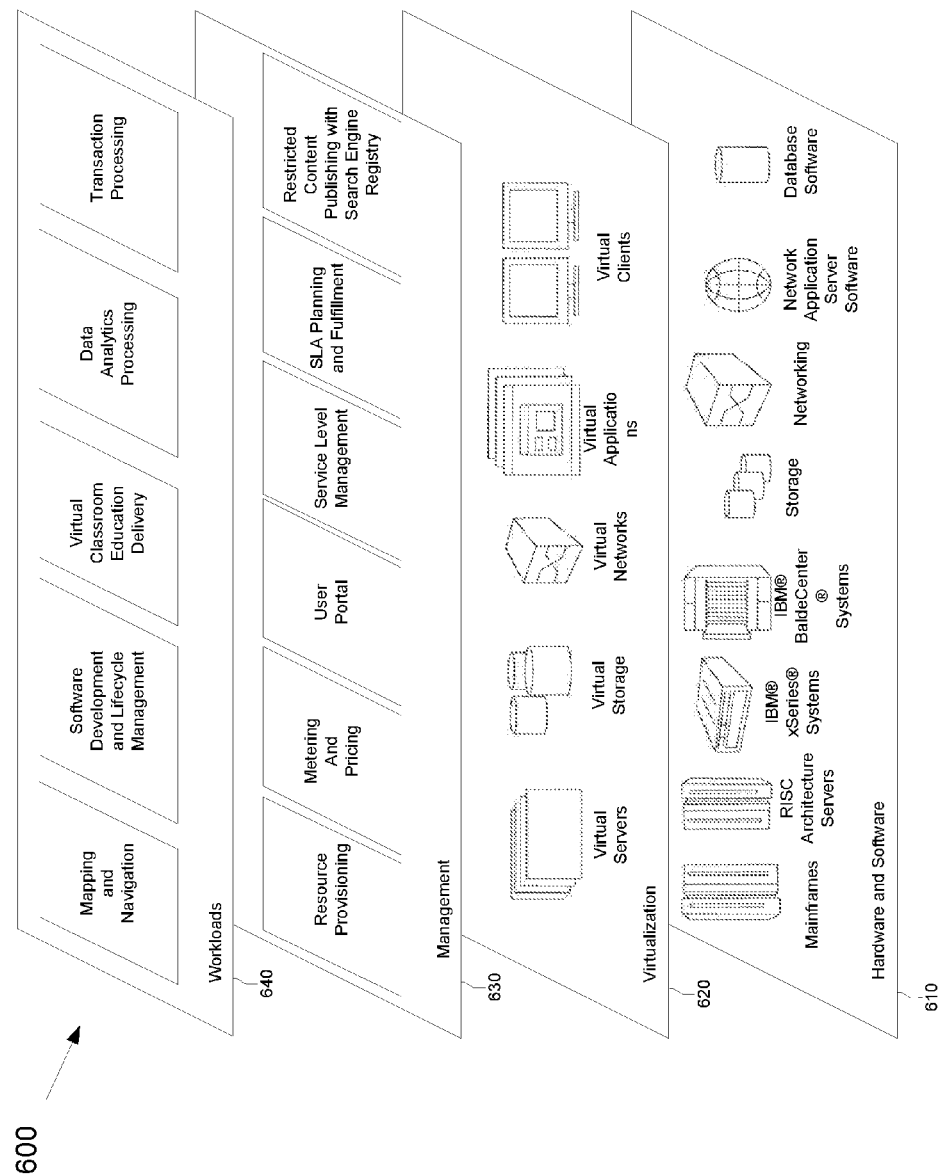
FIG. 4 is a block diagram of functional layers of the illustrative cloud computing environment of FIG. 5, in accordance with an embodiment of the present disclosure.

FIG. 4 is a set of functional abstraction layers 600 which are provided by the cloud computing environment 500 (as shown in FIG. 3). It should be understood in advance that the components, layers, and functions shown in FIG. 4 are intended to be illustrative only and embodiments of the invention are not limited thereto. As depicted, the following layers and corresponding functions are provided:

Hardware and software layer 610 includes hardware and software components. Examples of hardware components include: mainframes; RISC (Reduced Instruction Set Computer) architecture based servers; storage devices; networks and networking components. In some embodiments, software components include network application server software.

Virtualization layer 620 provides an abstraction layer from which the following examples of virtual entities may be provided: virtual servers; virtual storage; virtual networks, including virtual private networks; virtual applications and operating systems; and virtual clients.

In an example, management layer 630 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In an example, these resources may comprise application software licenses. Security provides identity verification for cloud consumers and tasks, as well as protection for data and other resources. User portal provides access to the cloud computing environment 500 for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A Restricted Content Publishing with Search Engine Registry Program may allow an authorized user of the restricted information to search for the content using an external search engine and using the links registry or metadata may identify the user searching for the content as an authorized user within the corporate domain and therefore, expose the restricted links within the corporate domain in the search results to the user.

Workloads layer 640 provides examples of functionality for which the cloud computing environment 500 may be utilized. Examples of workloads and functions which may be provided from this layer include: mapping and navigation; software development and lifecycle management; virtual classroom education delivery; data analytics processing; and transaction processing.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

FIG. 5 depicts a block diagram of components of a computing device, such as the client computer 102 or the server computer 104, of the system 100 of FIG. 1, in accordance with an embodiment of the present invention is shown. It should be appreciated that FIG. 5 provides only an illustration of one implementation and does not imply any limitations with regard to the environments in which different embodiments may be implemented. Many modifications to the depicted environment may be made.

The computing device may include one or more processors 702 (hereinafter "processor"), one or more computer-readable RAMs 704, one or more computer-readable ROMs 706, one or more computer readable storage media 708, device drivers 712, a read/write drive or interface 714, a network adapter or interface 716, all interconnected over a communications fabric 718. The communications fabric 718 may be implemented with any architecture designed for passing data and/or control information between processors (such as microprocessors, communications and network processors, etc.), system memory, peripheral devices, and any other hardware components within a system.

One or more operating systems 710, and one or more application programs 711, for example, the object location manager program 200, are stored on the one or more of the computer readable storage media 708 for execution by one or more of the processor 702 via one or more of the respective RAMs 704 (which typically include cache memory). In the illustrated embodiment, each of the computer readable storage media 708 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include the R/W drive or interface 714 to read from and write to one or more portable computer readable storage media 728. Application programs 711 on the computing device may be stored on one or more of the portable computer readable storage media 728, read via the respective R/W drive or interface 714 and loaded into the respective computer readable storage media 708.

The computing device may also include the network adapter or interface 716, such as a TCP/IP adapter card or wireless communication adapter (such as a 4G wireless communication adapter using OFDMA technology). Application programs 711 on the computing device may be downloaded to the computing device from an external computer or external storage device via a network (for example, the Internet, a local area network or other wide area network or wireless network) and network adapter or interface 716. From the network adapter or interface 716, the programs may be loaded onto computer readable storage media 708. The network may comprise copper wires, optical fibers, wireless transmission, routers, firewalls, switches, gateway computers and/or edge servers.

The computing device may also include a display screen 720, a touch screen 722, a keyboard or keypad 724, and a computer mouse or touchpad 726. The device drivers 712 interface to the display screen 720 for imaging, to the keyboard or keypad 724, to the computer mouse or touchpad 726, and/or to the display screen 720 for pressure sensing of alphanumeric character entry and user selections. The device drivers 712, R/W drive or interface 714 and network adapter or interface 716 may include hardware and software (stored on computer readable storage media 708 and/or ROM 706).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for object location managing, the method comprising:
    generating a first list comprising one or more personal objects based on a personal schedule of a user;
    generating a second list comprising one or more personal objects physically located within a predefined range of a checkpoint;
    comparing the first list to the second list to determine which personal objects are on both lists and which personal objects are missing, if any, from the second list;
    notifying the user with the results of the comparison between the first list and the second list by activating an alarm;
    generating a third list comprising one or more personal objects based on the personal schedule of a user, wherein the one or more personal objects on the third list are associated with a single personal object off the first list;
    generating a fourth list comprising one or more personal objects physically located within a predefined range of the single personal object off the first list;
    comparing the third list to the fourth list to determine which personal objects are on both lists and which personal objects are missing, if any, from the fourth list; and
    notifying the user with the results of the comparison between the third list and the fourth list.

2. The method of claim 1, wherein generating the first list comprises:
    generating the first list comprising one or more personal objects based on event information of an event on the personal schedule of the user, the event information comprises an event type, an event date, an event time.

3. The method of claim 1, wherein the first list is generated by a user.

4. The method of claim 1, wherein generating the second list comprises:
    scanning using an RFID reader for the personal objects on the first list, wherein a unique RFID tag is attached to each of the personal objects on the first list.

5. The method of claim 1, wherein generating the second list comprises:
    scheduling the generation of the second list based on an event time of an event on the personal schedule of the user.

6. The method of claim 1, wherein notifying the user with the results of the comparison comprises sending a text message to the user's smartphone.

* * * * *